United States Patent

[11] 3,542,397

| [72] | Inventor | Thomas I. Files |
| | | 917 Oklahoma, Mattoon, Illinois 61938 |
| [21] | Appl. No. | 793,375 |
| [22] | Filed | Jan. 23, 1969 |
| [45] | Patented | Nov. 24, 1970 |
| [73] | Assignee | Blaw Knox Company |
| | | Pittsburgh, Pennsylvania |
| | | a corporation of Delaware |

[54] TRUCK HITCH ARM ARTICULATING ROLLER
5 Claims, 3 Drawing Figs.

| [52] | U.S. Cl. | 280/460, 280/481 |
| [51] | Int. Cl. | B60d 3/00 |
| [50] | Field of Search | 280/460, 481 |

[56] References Cited

UNITED STATES PATENTS

| 3,138,392 | 6/1964 | Holland | 280/447 |
| 3,279,824 | 10/1966 | Brisbin et al. | 280/460 |
| 3,300,234 | 1/1967 | Layton | 280/460 |
| 3,304,101 | 2/1967 | Layton | 280/460 |
| 3,415,542 | 12/1968 | Urich | 280/460 |

*Primary Examiner*—Leo Friaglia
*Attorney*—Parker & Carter

ABSTRACT: A truck hitch for connecting a lead vehicle, such as an asphalt truck, to a trailing vehicle, such as an asphalt paver, having truck wheel rim-engaging rollers which are always in live contact with the wheel rim, the rollers being mounted to their carrying arms by a spherical-bushing assembly.

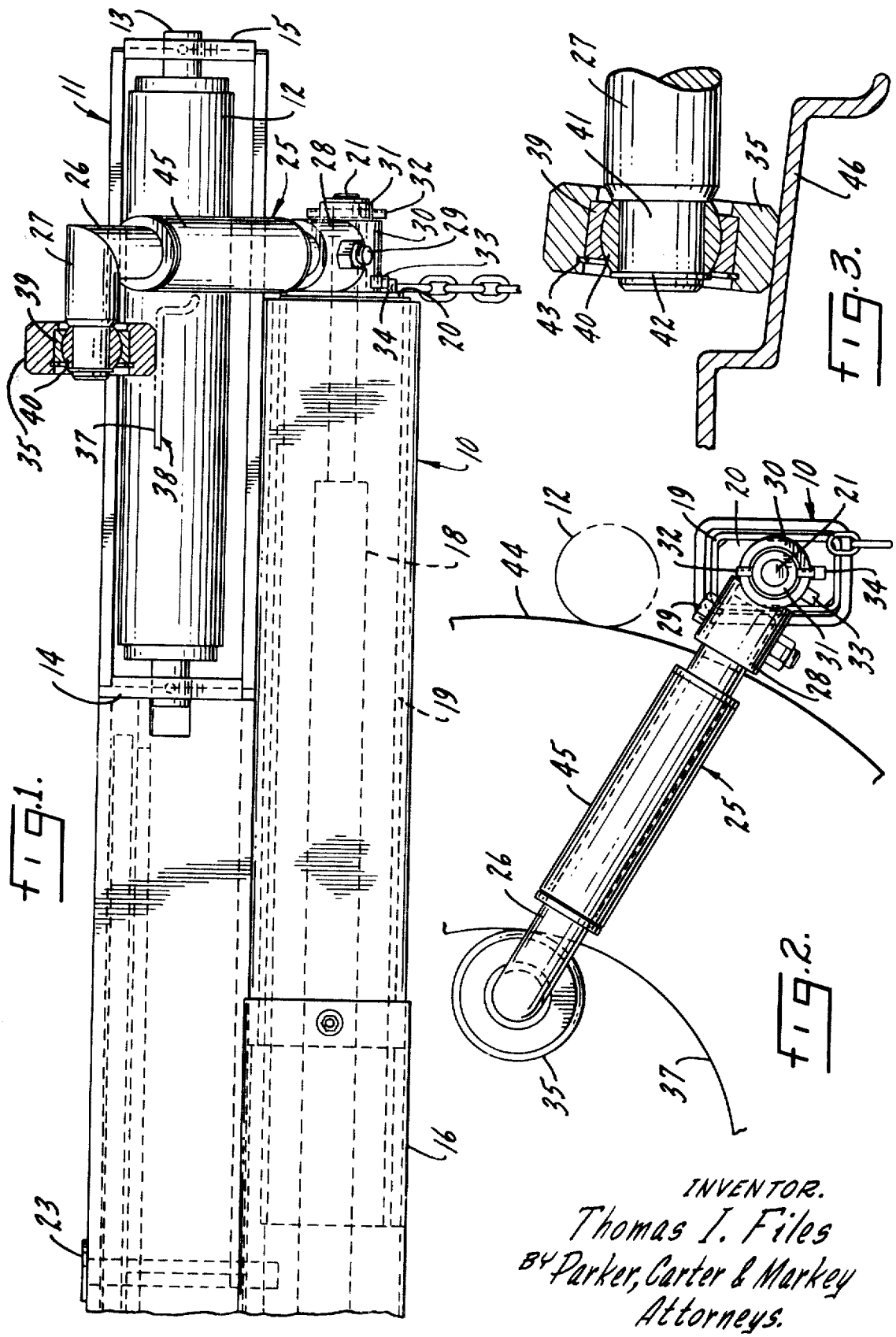

TRUCK HITCH ARM ARTICULATING ROLLER

This invention relates to hitching devices for connecting and maintaining one moving vehicle closely and positively positioned with respect to another moving vehicle. It specifically relates to a truck hitch for maintaining a moving supply vehicle, such as an asphalt delivery truck, in feed delivery position with respect to a receiving vehicle, such as an asphalt-paving machine, during the period of time in which the asphalt is delivered from the truck to the paver.

Truck hitch devices which are now widely used for connecting a supply truck to a moving piece of road machinery, such as a paver, generally employ a frame which may be pivotally attached to the paver, said frame carrying a pair of generally linearly extendable and retractable hitch arm assemblies which have wheel rim-engaging rollers at their outer ends. In conventional constructions however the wheel rim-engaging rollers carried at the extremities of the hitch arm assemblies are invariably oriented in a single plane. As a result, the forces generated when shifting movement occurs between the slave and master vehicles often are undesirably high with the result that premature failure of the hitch assembly may occur and/or damage to the wheel rim caused by gouging thereof by the roller may ensue.

Accordingly it is an object of the invention to provide a truck hitch which can be quickly and easily attached to truck wheel rims, and easily adapted to varying rim contours.

Another object is to provide a truck hitch as above described by which damage to the wheel rim, and to itself, resulting from the stresses induced from use are minimized, and the maximum stresses on any portion of the system kept within tolerable limits.

Another object of the invention is to provide a truck hitch as above described in which line contact between the wheel rim and wheel rim-engaging roller is maintained at all times, irrespective of the relative orientation, from moment to moment between the rigid portions of the hitch arm assembly and the truck wheel rim.

Other objects and advantages of the invention will become apparent from reading the following description thereof.

The invention as illustrated more or less diagrammatically in the accompanying drawing, wherein:

FIG. 1. is a partial front view with parts in section and others indicated in dotted lines, for clarity, of the invention illustrating its application to a straight wheel rim;

FIG. 2. is a side elevation view as viewed from the right of FIG. 1 with parts omitted for clarity; and FIG. 3. is a detailed section view to a larger scale illustrating the invention as applied to a tapered wheel rim.

Like reference numerals will be used to refer to like parts throughout the following description of the FIGS.

Referring first to FIG. 1, frame means are illustrated including a base structure, which may for example be a rectangular tube. The tube supports a push roller framework 11, which carries an oscillating push roller 12 journaled on shaft 13, said shaft, in this instance, being fast to a pair of upright end members 14, 15. A cover plate is indicated at 16.

A power cylinder indicated generally at 18 is located within the base tube 10, and, as best seen from FIG. 2, also within a hitch arm member indicated at 19. The hitch arm member, which may for example be a rectangular tube, is received within, and slides longitudinally with respect to, the base tube 10, but it is nonrotatable with respect thereto because of the rectangular configurations of the two members. An end plate 20 is apertured to receive a pivot shaft 21, which, in effect, is the extension of a piston rod slidable within cylinder 18.

In this instance the oscillating roller structure and hitch arm assemblies have been illustrated as pivotable about a vertical oscillation pivot indicated generally at 23.

A rim-engaging arm assembly is carried at the outer end of pivot shaft 21, said arm assembly being indicated generally at 25. The arm assembly includes a roller-mounting bracket 26 which has a generally inwardly turned portion 27 at its outermost extremity. The other extremity of the bracket is received within a collar 28 and secured thereto by fastener 29. The collar is welded or otherwise suitably secured to a sleeve 30 which in turn is received on hub 31. Hub 31 is secured, as by an insertable and removable pin 32, to the outermost end of pivot shaft 21.

As can be best visualized from FIGS. 1 and 2, a pair of interfering dogs, 33 and 34, associated, respectively, with the sleeve 30 and end plate 20 form an abutment or stop means which precludes the arm assembly from dropping completely downwardly when its outer end portion is not engaged.

The outer end portion 27 of bracket 26 carries a rim-engaging roller 35 which is adapted to engage the bearing surface 37 of a wheel rim 38.

It is one of the features of the invention that the rim-engaging roller is always maintained in line contact with the wheel rim irrespective of the relative orientation between the rim and the remainder of the structure, or the configuration of the rim. This is accomplished by mounting the wheel-engaging roller 35 to the outer end portion 27 of the arm assembly by a spherical-bushing assembly consisting of a spherical bushing 39, and a spherical socket 40 which is received on the outer end portion 27 of the arm assembly. As can be best visualized from FIG. 3, the spherical socket 40 has a bore of a diameter sufficient to be received on the necked down portion 41 of the outer end 27 of the arm assembly, the spherical-bushing assembly being maintained in position by snap ring 42 or any other suitable fastener. The bushing 39 may be a split bushing which is maintained in place by a snap ring or other suitable fastener 43.

It will be noted from a comparison of FIGS. 1 and 3 that irrespective of the configuration of the wheel rim the wheel rim roller will always remain in line contact with the bearing surface 37 of the rim.

It will be further understood that inasmuch as the nonillustrated portion of the truck hitch is identical in all respects, although reversed, position for position, to the illustrated half, the balance of the structure has been ommitted.

The use and operation of the invention are as follows.

The frame structure may or may not be movably mounted to a carrying vehicle, such as an asphalt-paving machine but in any event it is carried by such a vehicle which would be, in operation, a trailing vehicle. In a conventional normal operation an asphalt delivery truck, which may shuttle back and forth with other trucks between a source of supply of asphalt and the paver, is backed into alignment with the paver, the two-vehicles connected together, and the delivery truck-dumping mechanism actuated to deliver the asphalt into the paver as the paver moves forwardly over its base surface. One of the most common methods of maintaining the delivery truck closely positioned with respect to the paver is by use of a truck hitch device of the general type illustrated here. That is, a hitch arm assembly which carries at its outer most ends wheel rim-engaging roller assemblies is used to maintain the truck in delivery relationship to the paver by engagement of a roller at the outer end of each of a pair of rim engagement arm assemblies with the inner surface of the wheel rim. The truck is placed in neutral and the paver pushes the truck ahead of it, the pushing force being exerted through the oscillating roller 12 which is associated with the truck hitch structure.

Considering specifically the above described construction the power cylinder 18 is actuated to extend pivot shaft 21 outwardly, that is to the right, as viewed in FIG. 1, so as to enable the rim-engaging arm assemblies 25 to clear the truck tires. The truck operator backs the truck against the paver with the rear tires 44 of the truck in engagement with the oscillating rollers 12. The power cylinder 18 is then actuated to retract the rim-engaging arm assemblies 25. The arm assemblies 25 are dimensionally constructed so that the rim engagement roller 35 is inside, and in front of, the inner face 37 of the tires rim 38 when the side contact roller 45 bears against tires 44.

Since the rim engagement roller 35 is mounted by means of the spherical-bearing assembly to the outer end portion 27 of the roller-mounting bracket, the roller is free to wobble with respect to the necked down portion 41 of the bracket to which it is mounted, and thereby accommodate variations between the truck and the paver which may occur during normal operation, and likewise, variations between the configurations of truck wheel rims, as illustrated at 38 and 46. As a result, line contact is always maintained between the rim engagement roller 35 and the the bearing surface 37 which facilitates distribution of stress throughout the remainder of the hitch arm assembly, and prevents gouging of the wheel rim by by an edge of the roller 35. If desired, the edges of the roller 35 can be beveled as illustrated in FIGS. 1 and 3 but this is not essential with the illustrated system.

It will be noted that the truck hitch can be quickly and easily attached to the truck wheel rim irrespective of varying wheel rim contours and yet, when once attached, the gripping and positioning action is firm and positive.

Although a preferred embodiment of the invention has been illustrated and described it will be at once apparent to those skilled in the art that modifications may be made within the spirit and scope of the invention. Accordingly it is intended that the scope of the invention be limited not by the scope of the foregoing description but solely by the scope of the hereinafter appended claims when construed in the light of the pertinent prior art.

I claim:

1. In a device for connecting and maintaining a first vehicle having a wheel assembly which includes an internal wheel rim-bearing surface in a predetermined position with respect of a second vehicle, the combination of:

frame means mountable on the second vehicle;

said frame means carrying an elongated arm assembly having a bearing member at its outer end portion;

said elongated arm assembly being positionable in a location in which said bearing member is in bearing engagement with the internal wheel rim-bearing surface of said wheel assembly, and said internal wheel rim-bearing surface is located between the bearing member and the frame means; and means for orienting the bearing member on the outer end portion of said elongated arm assembly which enables said bearing member to be variably positioned with respect to said outer end portion of the elongated arm assembly to thereby maintain line contact between the bearing member and internal wheel rim-bearing surfaces of differing configurations.

2. The device of claim 1 further characterized:

firstly, in that the outer end portion of the elongated arm assembly is substantially perpendicularly oriented with respect to the direction of movement of the vehicles; and secondly, in that the bearing member is mounted for wobble movement on said outer end portion of the elongated arm assembly.

3. The device of claim 2 further characterized in that:

said orienting means includes a spherical-bearing assembly upon which the bearing member is mounted; and said bearing member being rotatable with respect to the outer end portion of the elongated arm assembly.

4. In a truck hitch for maintaining a leading vehicle such as a truck within predetermined position limits with respect to a trailing vehicle such as a paver, the combination of:

frame means carried by the trailing vehicle;

an elongated arm assembly having a shank portion extending towards the leading vehicle;

said elongated arm assembly having, at its outer end, an inturned portion disposed substantially perpendicularly to the shank portion;

said outer end portion carrying a wheel rim-engaging roller; and means for variably positioning the roller with respect to the outer end portion of the arm assembly to thereby maintain live contact between said roller and the wheel rim with which it is in engagement irrespective of the orientation of the wheel rim bearing surface with respect to the outer end portion of the arm assembly.

5. The truck hitch of claim 4 further characterized in that the wheel rim-engaging roller is mounted on the outer end portion of the arm assembly by a spherical bearing assembly.